(12) United States Patent
Chandra et al.

(10) Patent No.: US 7,319,674 B2
(45) Date of Patent: Jan. 15, 2008

(54) SYSTEM AND METHOD FOR EXCHANGING AWARENESS INFORMATION IN A NETWORK ENVIRONMENT

(75) Inventors: Madhavi W. Chandra, Cary, NC (US); David A. Cook, Raleigh, NC (US); Alvaro E. Retana, Morrisville, NC (US); Russell I. White, Holly Springs, NC (US); Yi Yang, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 10/625,994

(22) Filed: Jul. 24, 2003

(65) Prior Publication Data

US 2005/0018667 A1 Jan. 27, 2005

(51) Int. Cl.
*H04L 12/28* (2006.01)
(52) U.S. Cl. .................. 370/252; 370/254; 370/389; 370/401
(58) Field of Classification Search ................ 370/216, 370/218, 223, 252, 259, 261, 263, 389, 392, 370/395.3, 395.31, 401, 402, 295.3; 709/203, 709/204
See application file for complete search history.

(56) References Cited

U.S. PATENT DOCUMENTS

| | | | |
|---|---|---|---|
| 5,511,122 A | 4/1996 | Atkinson | 380/25 |
| 5,710,760 A | 1/1998 | Moll | 370/249 |
| 5,719,853 A | 2/1998 | Ikeda | 370/229 |
| 5,754,543 A | 5/1998 | Seid | 370/351 |
| 5,815,490 A * | 9/1998 | Lu | 370/223 |
| 6,085,976 A * | 7/2000 | Sehr | 235/384 |
| 6,122,283 A | 9/2000 | Lee | 370/408 |
| 6,366,962 B1 * | 4/2002 | Teibel | 709/245 |
| 6,542,469 B1 | 4/2003 | Kelley et al. | 370/238 |
| 7,061,858 B1 * | 6/2006 | Di Benedetto et al. | 370/219 |
| 2003/0067924 A1 * | 4/2003 | Choe et al. | 370/400 |
| 2003/0179707 A1 * | 9/2003 | Bare | 370/235 |
| 2004/0028060 A1 * | 2/2004 | Kang | 370/400 |

OTHER PUBLICATIONS

R. Ogier and M. Lewis, "Topology Dissemination Based on Reverse-Path Forwarding (TBRPF)," Mobile Ad-Hoc Networks Working Group, Internet-Draft, Apr. 22, 2003.

* cited by examiner

*Primary Examiner*—Chau Nguyen
*Assistant Examiner*—Shick Hom
(74) *Attorney, Agent, or Firm*—Baker Botts L.L.P.

(57) ABSTRACT

A method for communicating packets in a network environment is provided that includes receiving a packet at a network element and identifying a sequence number included in the packet that correlates to awareness information associated with one or more adjacent network elements. A table included in the network element may be updated in order to account for the awareness information included within the packet that has not been accounted for by the network element. In cases where the awareness information included in the packet has already been accounted for, the packet may be ignored.

28 Claims, 3 Drawing Sheets

SYSTEM AND METHOD FOR EXCHANGING AWARENESS INFORMATION IN A NETWORK ENVIRONMENT

TECHNICAL FIELD OF THE INVENTION

This invention relates in general to the field of communications and more particularly to a system and method for exchanging awareness information in a network environment.

BACKGROUND OF THE INVENTION

Networking architectures have grown increasingly complex in communication environments. This complexity has resulted in numerous protocols being implemented in order to ensure that network elements are aware of their surroundings. For example, certain network elements may exchange packets in order to indicate to each other the absence or presence of an adjacent network element. In this sense, neighbors are able to become aware of their surroundings and direct or manage traffic accordingly.

As network systems become more sophisticated, this information exchange may become cumbersome. This may be due to a number of reasons, such as having a prolific amount of network elements in the system such that the information included in any given packet is lengthy and extensive. As a byproduct of such lengthy packets, communication speeds and system performance may be inhibited. Moreover, because of the overwhelming quantity of information that must be exchanged in the network, bandwidth may be unnecessarily restricted, as well as additional resources consumed in order to accommodate the requisite processing cycles. The ability to properly identify surrounding elements and account for other elements, which may become dysfunctional, is critical in order to provide effective network communications. Thus, the ability to offer a system or a protocol that is capable of quickly and accurately identifying existing network elements provides a significant challenge to network designers and system administrators.

SUMMARY OF THE INVENTION

From the foregoing, it may be appreciated by those skilled in the art that a need has arisen for an improved communications approach that provides for an increased awareness feature or characteristic in packet communications in a network environment. In accordance with one embodiment of the present invention, a system and method for communicating awareness information in a network environment are provided that greatly reduce disadvantages and problems associated with conventional packet communication techniques.

According to one embodiment of the present invention, there is provided a method for communicating packets in a network environment that includes receiving a packet at a network element and identifying a sequence number included in the packet that correlates to awareness information associated with one or more adjacent network elements. A table included in the network element may be updated in order to account for the awareness information included within the packet that has not been accounted for by the network element. In cases where the awareness information included in the packet has already been accounted for, the packet may be ignored.

Certain embodiments of the present invention may provide a number of technical advantages. For example, according to one embodiment of the present invention, a communication approach is provided that allows for the incremental transmission of neighbor states, which conserves resources and reduces network overhead. This may be a result of the size of the incremental neighbor state updates, which may be much smaller than a normal adjacency maintenance packet (e.g. via a Hello packet). Thus, because less information is included in each of the packets, fewer resources are consumed as the packet is properly processed. This is due, in part, to the packet reflecting only the changes in the network and not necessarily the full state information associated with every element in the network. Additionally, the smaller packet size may translate into less network bandwidth being occupied by routing protocols engaged in state maintenance. This may be particularly important in certain types of networks, e.g. lower speed networks, shared medium networks, etc., but generally beneficial to any packet communications.

Another technical advantage associated with one embodiment of the present invention also relates to the incremental transmission of neighboring states. In essence, a smaller packet size allows transmitting and receiving devices to expend less power in receiving and processing this information. This operates to accommodate more robust communications and to conserve resources in the network. Moreover, on the receipt of each neighbor state packet, a given receiver need only check the state check indicator, in contrast to walking through an entire list of neighboring states in order to verify the neighboring state information. This could then reduce central processing unit (CPU) cycles for the receiving device, which may be critical in any number of applications. Additionally, if the neighbor state has changed, a receiving device need only manage the changed information rather than walk through a list of all information and determine what has changed and what has remained constant, and then proceed to address some deficiency or update its internal data. This, similarly, may reduce processing in the receiving device. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
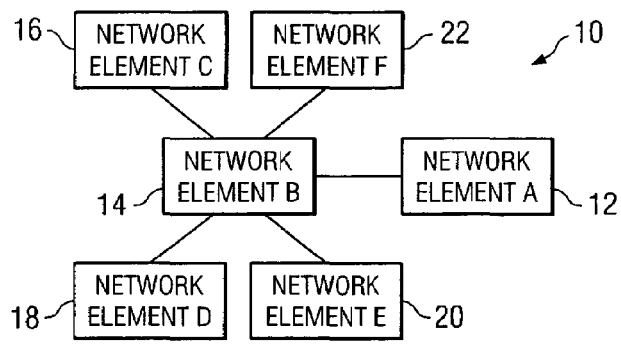
FIG. 1 is a simplified block diagram of a communication system for communicating packets in a network environment in accordance with one embodiment of the present invention.

FIG. 1 is a simplified block diagram of a communication system 10 for communicating awareness information in a network environment. Communication system 10 may include multiple network elements 12, 14, 16, 18, 20, and 22. Network elements 12, 14, 16, 18, 20, and 22 may also be referred to herein as network elements A-F respectively. The letter designations assigned to network elements 12, 14, 16, 18, 20, and 22 are arbitrary and have been used for purposes of teaching only. These designations should not be construed in any way to limit their capabilities, functionalities, or applications in the potential environments that may benefit from the features of communication system 10. FIG. 1 may be generally configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate.

In accordance with the teachings of the present invention, communication system 10 provides a communication approach that allows network elements A-F to exchange information via a suitable protocol such that only a change in state information is included in a given packet. For example, when network elements A-F exchange information via a Hello packet, this information may reflect the most recent appearance (presence) or absence of adjacent network elements. This information may be provided in the Hello packet and inclusive of the neighbors on corresponding links that extend from a given network element 12, 14, 16, 18, 20, and 22.

For purpose of teaching, it is important to understand the extensive communications that may be traversing the network in order to provide awareness information to any given network element. Routing protocols generally include various types of neighbor states in their periodically transmitted neighbor state packets. For instance, a routing protocol may include a list of known neighbors on a given link so that each network element A-F attached to that network can establish whether or not two-way connectivity exists between itself and the network element that is transmitting the packet. For example, in a mobile ad hoc network (MANET) environment, the amount of state information carried in such neighbor state maintenance packets may need to be expanded, while concurrently the available bandwidth, packet size (maximum transmission unit on the link), and available power to communicate these expanded packets is significantly decreased.

In most scenarios, it is generally important to be made aware of the presence or the absence of a neighbor as quickly as possible. Thus, packets may be communicated to adjacent network elements in order to provide routine or systematic updates, which reflect current or the most recent state information. In this sense, network elements need only know what is new or what has been changed in the network.

Some networks (e.g. wireless networks) are particularly sensitive to (or experience deficient performance because of) lengthy communications or packets that include a prolific amount of data. Intra-element communications may present packets inclusive of huge chunks of data that are difficult to process in the network. The packets may be congruous, inclusive of an extensive listing of the neighbors that are present or absent in the network. The absence of a neighbor may indicate that something has happened, for example some element has become non-operational or dysfunctional. The presence of a network element may reflect an already existing element or a new element that was added to the networking architecture. It is generally not necessary that all information be included in a single transmission. The only element of particular interest is the change or the delta: not necessarily the redundant data.

Communication system 10 overcomes such challenges by providing a mechanism that allows for only the most pertinent information to be carried in packet exchanges, without overloading the links or the devices that transmit the information. Full neighbor state updates may be transmitted between network elements A-F as needed. This may be in response to a new neighbor relationship being formed and/or possibly reflect periodic updates in the network. Those neighbors that already have full state information may ignore the updates, while the neighbors that are missing a given state may choose to process the updates. A state reflecting the full update of information may be described with a state sequence number, which is a small to medium link number that may be assigned from a circular space. Subsequent transmissions of the protocol's neighbor state information may include only this state sequence number. The state sequence may be referred to by other peers in order to determine if they have the most recent neighbor state information from a given device. In cases where a selected one of network elements A-F receive two subsequent neighbor state packets from the same neighbor with different state sequences, the selected network element may request a neighbor state update from the sender by communicating the currently known sequence number for that transmitter to the transmitter network element. If the neighbor state changes in any way, the incremental information (with a new state sequence) may be transmitted in a set of neighbor state packets within an incremented state sequence.

Between the transmissions of a full adjacency state, peers of network elements A-F may maintain local information that indicates the last neighbor state transmitted and may also operate assuming this information is correct. This may be effectuated provided that the given network element continues to receive neighbor state packets with the most current state sequence. In order to accommodate large amounts of information and a full update, the ability to fragment the information across Hello packets may be added using a fragment sequence.

Thus, in the context of an example environment, such as that provided in FIG. 1, initially network element A may have several neighbors. Packets may be being communicated between network elements A-F, the packets may include a header and a list of all network elements adjacent to the transmitting element. The size of these communications could be huge and, in egregious cases, require some fragmenting operation to be performed. However, communication system 10 may avoid such cumbersome operations in allowing minimal communications after network elements A-F have been synchronized with an initial packet. Afterwards, only changes may be sent such that a packet header is communicated with a sequence number, but without corresponding information in the packet. Thus, in place of the information, a sequence number may be included to indicate that a state has not changed.

For example, in a case where an initial sequence number equals five and a new neighbor is discovered, the sequence number may be incremented to six in order to add the new network element as a neighbor. Now, a Hello packet may be communicated with a header that includes a sequence number of six. In cases where any given network element misses an update, eventually the network element may receive a packet that includes the header and an appropriate sequence number. Thus, the network element that missed a particular update may recognize that something has been missed and request that information. In this sense, a failover characteristic is being provided by communication system 10. The header of the Hello packet being communicated may include a sequence number, which may include an identity, profile, indicator or key associated with the corresponding network element. This may be any suitable identifying parameter, feature, or characteristic, such as an IP address for example.

Network elements A-F are routers in an example embodiment; however, network elements A-F may be any other suitable device where appropriate and in accordance with particular needs. For example, network elements A-F may be switches, gateways, bridges, loadbalancers, firewalls, or any other suitable device, component, element, or object operable to exchange information associated with awareness in a network environment. In addition, network elements A-F may include any suitable hardware, software, components, modules, interfaces, or objects that facilitate the operations thereof. This may be inclusive of appropriate algorithms and communication protocols that allow for the effective exchange of data or information. In an example embodiment, the update information may be exchanged via Hello packets. In alternative embodiments, network elements A-F may use any suitable communication protocols that operate to indicate the presence or absence of surrounding or adjacent network elements. Note that the terms 'adjacent' and 'surrounding' reflect broad terminology that may be used interchangeably herein in this document. These terms connote an idea of awareness, as it relates to any component, device, or element that can be reached by a given network element A-F.

Each of network element A-F may include a number of suitable algorithms, hardware, and software (or any suitable combinations thereof) that may be configured to provide a transmitter state and a receiver state. Thus, with respect to the transmitter state, an algorithm may be present, from the perspective of network element B, that communicates Hello packets to another network element. Included within the transmitter state, in an example embodiment, may be a table of state information with sequence numbers, a Hello timer, a fragment pacing timer, a table of neighbors that have been heard from, but which have not established a state, and a table of neighbors with which the transmitting network element has a state.

With respect to the receiver state, an algorithm may be present in network element B that receives a Hello packet. The receiver state may include a table of state information that is received per transmitter. The receiver state may also include a current sequence per transmitter, a current fragment, a complete bit per transmitter, a dead timer per transmitter, and a table of neighbors that have been heard from, but which do not include an established state. Any other suitable pertinent information may be included in each of the transmitter and receiver states where appropriate and in accordance with particular needs.

In order to illustrate some additional example operations associated with communication system 10, the following discussion is provided for purposes of discussion and teaching only. In an example embodiment, it is presumed that network elements A-F represent a small group of interconnected devices (e.g. such as routers). Communication system 10 allows for these elements to achieve synchronization without receiving all information about every network element and, thus, only provides information associated with a change or delta in the network. In an initial stage of the sequence, network element B may be peered with network elements C, D, and F: but not with network elements A or E. FIG. 1 illustrates (for purposes of simplicity), that network elements A, C, D, E, and F cannot reach one another, except through network element B.

When network element B detects network element A as a new peer, it may communicate a Hello packet with the identifier associated with network element A in the list of new, unsynchronized neighbors. When network element A detects network element B as a new neighbor, it may also communicate a Hello packet with an identifier associated with network element B in the list of new, unsynchronized neighbors. When network element B detects its identifier in the list of new neighbors transmitted by network element A, it may communicate a Hello packet containing the full neighbor state information associated with each of its connected neighbors (C, D, and F) to network element A, thereby assigning that state a state sequence number of one hundred in an example embodiment. Once the full state update is communicated, network element B may remove network element A from its new neighbor list. When network element A receives a Hello packet, it may note the neighbor state that network element B has transmitted, as well as its current state sequence. Network element A may also remove network element B from its new neighbor list.

Future Hello packets transmitted by network element B may contain only state sequence one hundred. Provided that network element A continues to receive periodic Hello packets with this state sequence included therein, network element A may assume the information that network element B communicated in its last update is still valid. Network element B may now receive a new neighbor: network element E. Network element B may respond by placing an identifier associated with network element E in its new neighbor list for the Hello packets that will be communicated. Network element E may receive the Hello packet and note its identifier in the new neighbor section of the Hello packet of network element B. On detecting network element B as a new neighbor, network element E may also place an identifier associated with network element B in its new neighbor list for its Hello packets. On receiving the Hello packet from network element E (inclusive of its own local identifier), network element B may transmit a full state update. Network element E may accept these updates as a new state, storing the information while network element A may ignore this update as a repeated state because the sequence number matches the current sequence, which network element B is using.

Network element B may build a Hello packet with neighbor state information that adds network element E only, assigning a new state sequence of one hundred one. Network element A may receive this Hello packet and add the information about network element E to the list of neighboring information provided by network element B. Network element A may set the state sequence associated with network element B to one hundred one. Network element B may continue sending Hello packets with only the state sequence of one hundred one in the packets.

In an example case when network element B loses network element E as a neighbor, it may communicate a Hello packet indicating this loss along with the new state sequence of one hundred two. In cases where network element A fails to receive this Hello packet, the following may occur. Network element B may communicate its next Hello packet with only the state sequence of one hundred two. Network element A may receive this Hello packet and compare the state sequence to the last known indicator from network element B, which was one hundred one. Because there is a mismatch, network element A may identify that it has lost some neighbor state information from network element B. Network element A may transmit its last known state sequence to network element B, which is one hundred one. Network element B may determine, from this information and the amount of state saved locally, whether it should re-transmit the incremental state change, or simply re-transmit a full state update using state sequence one hundred two, to network element A. This process, which may be repeated continuously, reflects an application of incremental updating of data to the information that may be normally carried in a periodic neighbor awareness message (e.g. Hello packets).

Thus, communication system 10 provides a communication approach that allows for the incremental transmission of neighbor states, which thereby conserves resources and reduces network overhead. This may be a result of the size of the incremental neighbor state updates, which may be much smaller than a normal adjacency maintenance packet (e.g. via a Hello packet). Thus, because less information is included in each of the packets, fewer resources are consumed as a given packet is properly processed. This is due, in part, to a given update packet reflecting only the changes in the network and not necessarily the full state information associated with every element in the network. Additionally, the smaller packet size may translate into less network bandwidth being occupied by routing protocols engaged in state maintenance. This may be particularly important in certain types of networks, e.g. lower speed networks, shared medium networks, etc.: but generally beneficial to any packet communications.

The incremental transmission of neighboring states also yields a smaller packet size, which allows transmitting and receiving devices to expend less power in receiving and processing this information. This operates to accommodate more robust communications and to conserve resources in the network. Moreover, on the receipt of each neighbor state packet, a given receiver need only check the state check indicator, in contrast to walking through an entire list of neighboring states in order to verify the neighboring state information. This may reduce central processing unit (CPU) cycles for the receiving device, which may be critical in any number of applications. Additionally, if the neighbor state has changed, a receiving device need only manage the changed information rather than walk through a list of all information and determine what has changed and what has remained constant, and then proceed to address some deficiency or update its internal information. This, similarly, may reduce processing in the receiving device.

Figure 2:
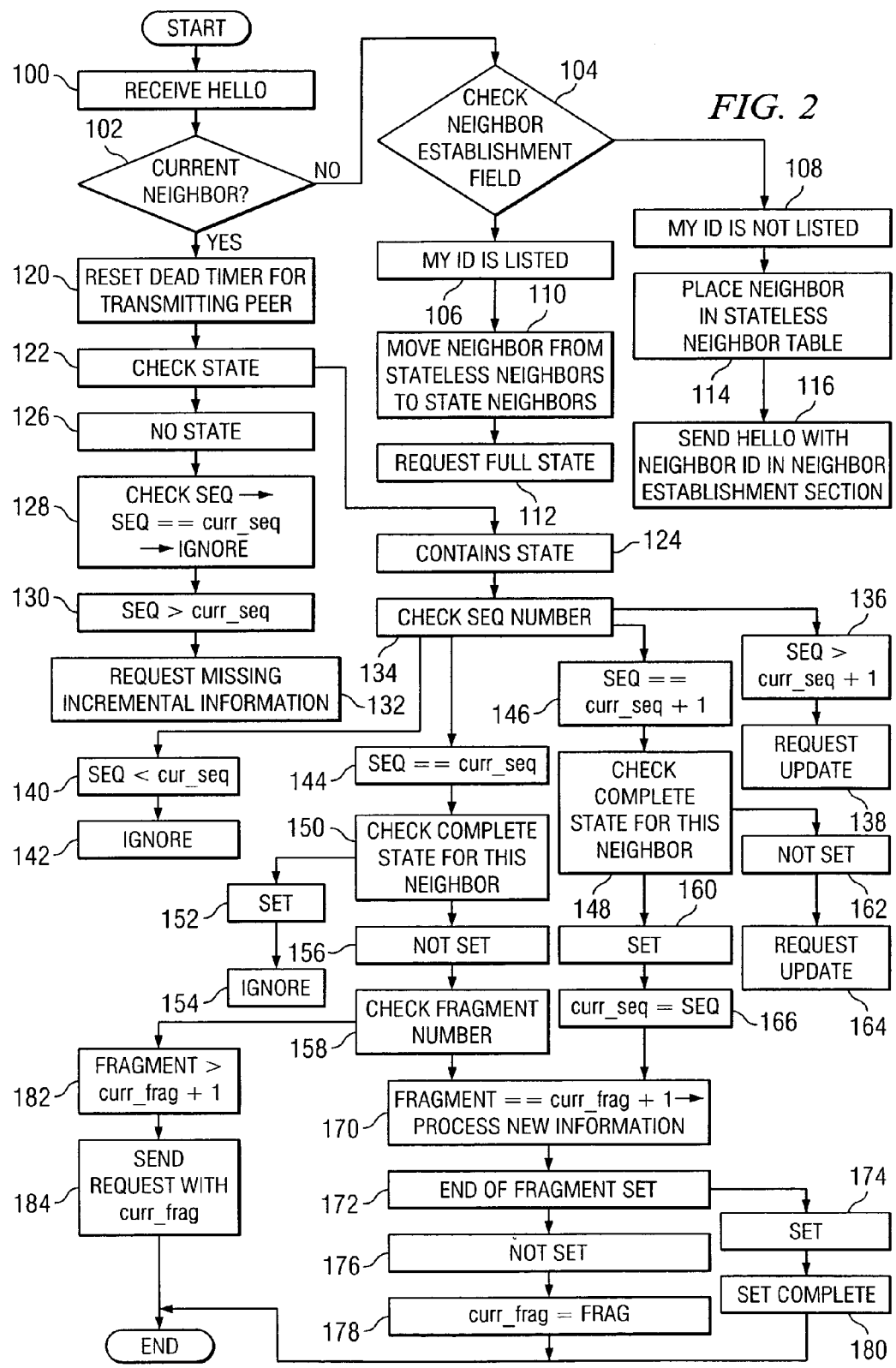
FIG. 2 is a simplified flowchart illustrating a series of example steps associated with a receiver perspective of the communication system.

FIG. 2 is a simplified flowchart illustrating a series of example steps associated with a receiving perspective within communication system 10. For example, FIG. 2 represents an example operation from the perspective of network element B. In such a configuration, as well as other configurations described with reference to FIGS. 3-5, the corresponding network element may be suitably equipped with a receiving state (interface), a transmitting state (interface), and/or any suitable algorithm, software, hardware, module, object or element operable to effectuate the operations of the corresponding network element. In this sense, FIG. 2 may be representative of a receiver state machine perspective, the receiver state machine being conducive to packet communications in a network environment.

The flowchart may begin at step 100, where network element B receive a Hello packet. At step 102, it may be determined whether a current neighbor has been discovered. In cases where there is not a current neighbor, the neighbor establishment field may be checked at step 104. Thus, at step 104 it is being determined whether the Hello packet was communicated from a current neighbor or one that's never been seen by the receiving network element. At step 104, it may be determined whether its own local identifier is listed. If its identifier is not listed, as is reflected by step 108, the new neighbor may be placed in a stateless neighbor table at step 114. At step 116, a Hello packet may be communicated with the neighbor indicator in the neighbor establishment section.

Concurrently, after it is discovered that a local indicator is listed at step 106, the neighbor indicator may be moved from a stateless neighbors list to the state neighbors list at step 110. At step 112, a request for a full state of information may be executed. While these processes are occurring, a parallel operation may be being effectuated in cases where the Hello packet received at step 100 indicated that the network element in the Hello packet was indeed a current neighbor. In such cases, the dead timer for a transmitting peer may be reset at step 120. Accordingly, at step 120 a timer is being initiated such that if we do not hear from a certain network element in a certain amount of time, we declare that entity dead or non-operational. Each time a Hello packet is received, the time may be reset so that the timer has to expire before a given network element is declared down. The state may then be checked at step 122 and, in cases where the state information is contained (step 124), the sequence number may be checked at step 134. At step 122, the state information of the Hello packet is checked. This could include notifications that some network element has left the network or that a new network element has been added to the network. At step 122, if the sequence number if greater and no state information is present to support this proposition, then something has been missed. This may be because of some miscommunication in the network because new state information should be provided each time the sequence number is incremented. Communication system 10 provides the ability to request missing information and, accordingly, catch up or learn the information that was missed.

Where a state has not been provided, such as what is illustrated in step 126, the sequence number may be checked. In cases where the sequence number check reveals that the sequence is equal to the current sequence, such a Hello packet may be effectively ignored at step 128. The sequence number reveals the identity of a corresponding network element. Where the sequence number is greater than the current sequence, as reflected by step 130, missing incremental information may be requested at step 132.

After the check sequence number operation is executed at step 134, it may be determined if the sequence number is less than the current sequence number at step 140. Similarly, it may be determined if the sequence number is equal to the current sequence at step 144. In cases where the sequence number if less than the current sequence, the Hello packet may be ignored at step 142. Step 142 indicates the condition in which everything is acceptable, i.e. from the perspective of network element A, this sequence number has already been processed. As this process is being executed, a parallel operation may be being executed in order to determine if the sequence number is greater than the current sequence number plus one, reflected by step 136. In cases where this is true, an updated request may be communicated at step 138. Step 138 effectively illustrates how a request for an update of all neighbors can resynchronize all elements in the network. Similarly, a checking mechanism may be executed at step 146 in order to determine whether the sequence is equal to the current sequence number plus one. In cases where this is true, the complete state for this neighbor may be checked at step 148. Similarly, from step 144 where it is determined whether the sequence number equals the current sequence, in cases where this is true, the complete state for this neighbor may be checked at step 150.

Steps 152, 160, and 162 reflect an operation that considers whether information is part of a set. With respect to step 152, in cases where it is, the corresponding information may be ignored at step 154. A set refers to the indication that all is present that should be. There may be some cases where there are so many neighbors present in the network that a packet needs to be fragmented. In cases where the current sequence number is equal to the sequence number, the flowchart may move from step 160 to step 166 in order to verify this value. In addition, in cases where this information is not part of a set, step 162, an update may be requested at step 164. Where the current sequence is equal to the sequence, as verified in step 166, it may be determined whether the fragment equals the current fragment plus one such that it is appropriate that new information be processed, as reflected by step 170. Similarly, from step 156, where it is determined that this information is not part of a set, the fragment number may be checked at step 158. Thus, at step 156 and in cases where a full set is not represented, a check needs to be executed on the fragment number in order to account for the multiple portions of the packet. From step 158, the process may move to step 170 (as described above) or to step 182 in order to determine whether the fragment is greater than the current fragment plus one. At step 184, a request may be communicated with the current fragment before this portion of the flowchart ends. In addition, from step 170, it may be determined whether the process has identified the end of the fragment set at step 172. If the set is complete, as identified in steps 174 and 180, then the process may end. Where there is not a complete set, such as that indicated by step 176, then it may be determined whether the current fragment is equal to a fragment value at step 178 before the process ends.

Figure 3:
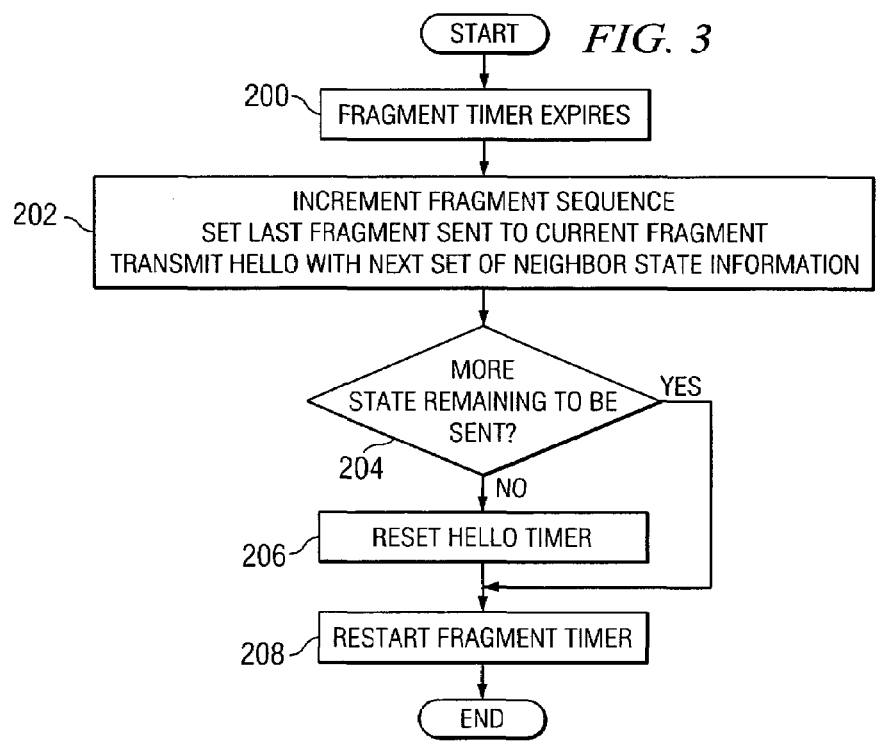
FIG. 3 is a simplified flowchart illustrating a series of example steps associated with a fragment timer that may be included within the communication system.

FIG. 3 is a simplified flowchart illustrating a series of example steps associated with a fragment timer from the perspective of any selected network element A-F, which is transmitting Hello packets. The flowchart may begin at step 200, where the fragment timer expires. At step 202, the sequence number associated with the fragment may be incremented. In addition, the last fragment sent may be set to the current fragment value and the Hello packet with the next set of neighbor state information may be transmitted. At step 204, it may be determined whether more state information remains to be sent. In cases where this is true, the fragment timer may be restarted at step 208. In cases where this is not true, the Hello timer may be reset at step 206.

The fragment sequence number essentially keeps track of all the fragments that are being communicated in the network. At the end of sending all the fragment portions, it may be determined if there are more states that need to be communicated, and in cases where this is not true, the Hello timer is reset at step 206. Step 208, thus, allows for the transmission of another fragment with additional state information.

Figure 4:
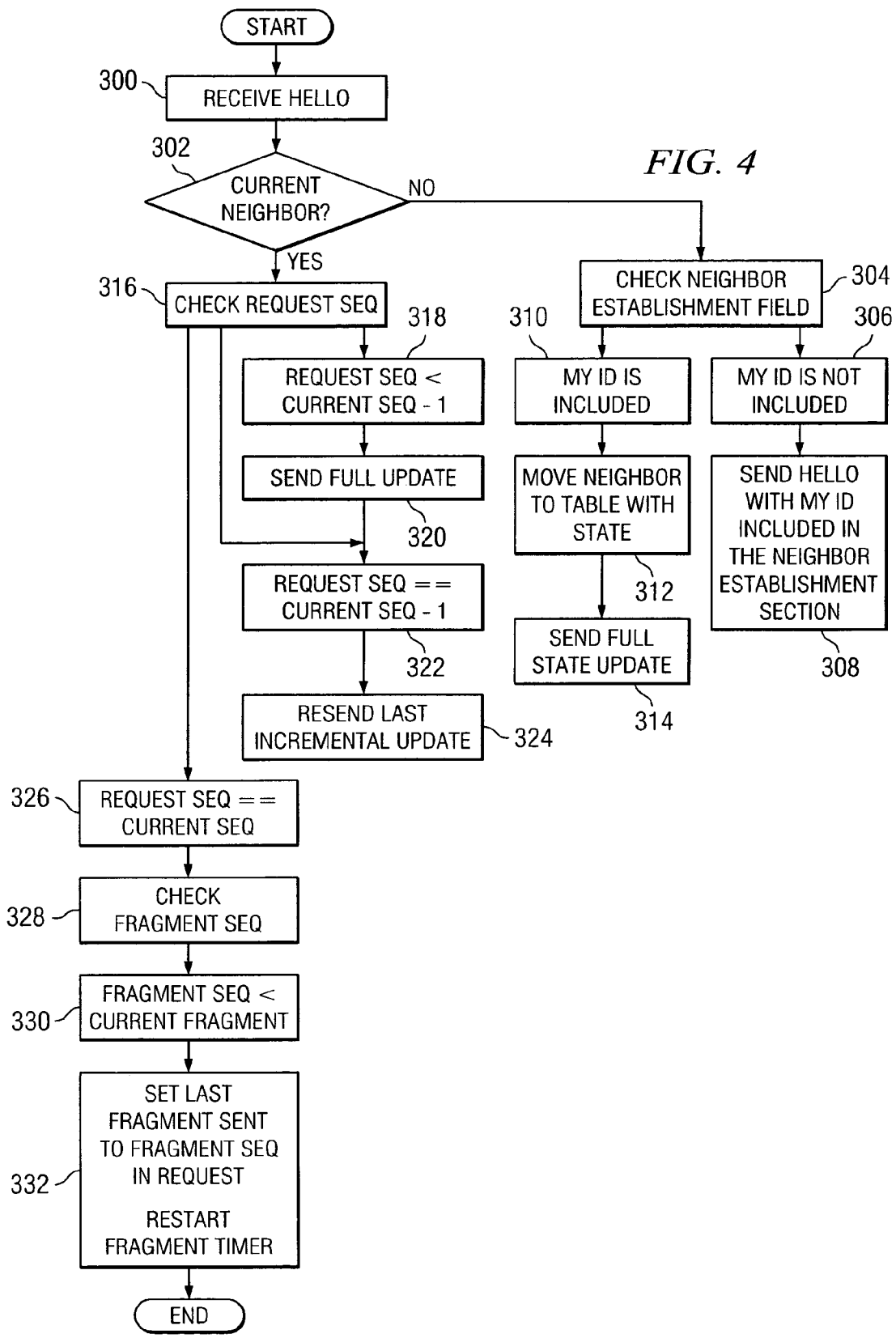
FIG. 4 is a simplified flowchart illustrating a series of example steps associated with a receiver perspective in the communication system.

FIG. 4 is a simplified flowchart illustrating a series of example steps associated with a perspective of network element B. It should be appreciated that as network element B is transmitting, it may also be utilizing the Hello packets that are being received (e.g. receiving requests or other information that may have been missed). Thus, FIG. 4 reflects a scenario in which more operations are being executed other than simply setting a dead timer and checking state information. Instead, FIG. 4 offers a scenario in which the request sequence number is being evaluated. In one scenario, requests may be piggybacked on the Hello packets that are being communicated from the network element. For example, from a transmitter state perspective, it may be determined how to alter what is being transmitted based on what is being received. Network element B may address the issue of whether something needs to be effectuated based on what is being received.

The flowchart may begin at step 300 where a Hello packet is received. Much like in FIG. 2, at step 302, it may be determined whether the Hello packet reflects a current neighbor. If the answer to this inquiry is true, then the flowchart moves to step 316 where the request sequence is checked. If the answer to this inquiry is no, then the neighbor establishment field may be checked at step 304. Where a local indicator is included, reflected by step 310, the process may move to step 312 where the neighbor may be moved to a table with state information. At step 314, it may be determined whether to communicate the full state update before proceeding to step 316. In cases where a local indicator is not included in the Hello packet, such as what is reflected by step 306, a Hello packet may be communicated with the indicator included in the neighbor establishment section, as reflected by step 308.

From step 316, it may be determined whether the request sequence number is less than the current sequence number minus one (as illustrated by step 318). The full update may then be sent at 320 and it may be determined whether the request sequence number is equal to the current sequence number minus one, as reflected by step 322. Step 322 reflects a condition in which a network element is simply one sequence number behind the current state. At step 324, the last incremental update may be resent. At step 326, it may be determined whether the request sequence number is equal to the current sequence number. At step 328, the fragment sequence number may be checked. At step 330, it may be determined whether the fragment sequence is less than the current fragment. The last fragment sent may be set to the fragment sequence number in the request, and the fragment timer may be restarted at step 332.

It is important to note that the steps in FIGS. 2-4 illustrate only some of the possible scenarios that may be executed by or within communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, and timing mechanisms may be provided without departing from the teachings of the present invention.

Figure 5:
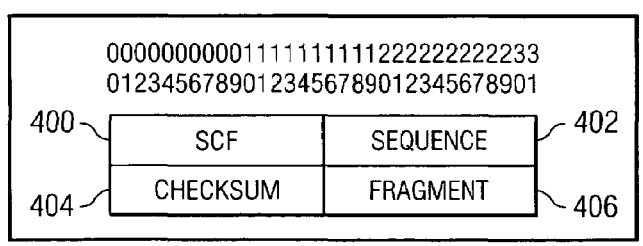
FIG. 5 is a simplified block diagram of an example packet that may be exchanged in the communication system.

FIG. 5 is a simplified block diagram illustrating an example packet that may be propagating through communication system 10. The packet may include an SCF field 400, a sequence field 402, a checksum field 404, and a fragment field 406. Thus, a segment of information associated with a sequence, a checksum fragment, and an options header may be provided for a corresponding protocol that allows communications between network elements A-F. Checksum field 404 may provide an error detection element that may be executed at either end of a communication involving the packet. SCF field 400 provides several options and represents bits in the header of the packet that may be used or properly set in order to effectuate some operation. Thus, when a certain group of set conditions are provided, a corresponding group of operations may be achieved or produced.

In cases where the S portion (bit) of SCF field 400 is provided with one bit, the corresponding device (i.e. a selected network element A-F) may be viewed as a stub, which cannot transmit traffic. In cases where the C portion (bit) of SCF field 400 is equal to one bit, a checksum may be executed. When this bit is set, a two-octet checksum may be included in the header. The checksum may be included in any packet that contains the state information. In order to compute the checksum, checksum field 404 may be set to zero, and the checksum may be executed over an entire data portion (including the header) through the last type length value (TLV) included in the fragment of information. This may include the end of the fragment TLV, where one exists. TLV may represent a standard manner of encoding information in the packets. The result of this process may be positioned in checksum field 404. In cases where the F field of SCF field 400 is equal to one bit, this may denote the existence of a fragment number and checksum. Where this bit is set, a two-octet fragment number may be included following the sequence number. In cases where this bit is not set, an end of fragment TLV is generally not included.

With respect to the sequence number, a two-octet serial number indicating the current transmitter state taken from a circular number space may be suitably provided. With respect to variable length state information, this may be inclusive of information about the addition of a new neighbor, the loss of a neighbor, the changes in the cost required to reach a neighbor, or any other suitable information. This information may be properly formatted in TLVs. In cases where the type is provided as one octet, an integer between zero and (e.g.) one hundred ninety one, noting the type of state change information carried, may be provided. In cases where the length is equal to one octet, an integer noting the length of the state change information carried in octets may be provided. The state change information is a variable length state change. If the protocol does not provide an initial two-way connection check within the protocol Hello packet, a TLV can be added that provides a list of new neighbors that have not been synchronized. This may allow the initial neighbor discovery and two-way connectivity checking to be done outside the state sequence numbering. The sequence number of the last known appropriate state information received may also be provided. The fragment may be provided as two octets. The fragment number of the last known good state information received may be provided and, if the entire state sequence is believed to be missing, this may be set to zero.

Although the present invention has been described in detail with reference to particular arrangements and configurations, these example configurations and arrangements may be changed significantly without departing from the scope of the present invention. For example, although the present invention has been described with reference to particular communication exchanges involving a Hello packet, communication system 10 may be applicable to other exchanges, routing protocols, or routed protocols in which packets (not necessarily Hello packets) are exchanged in order to provide awareness information. Moreover, communication system 10 may be applicable to any suitable element or component within the network that seeks to become aware of its neighboring devices through any communications protocol. Thus, any application where there is a need to communicate state information (potentially in an incremental manner), and where synchronization may be beneficial, may benefit from the teachings of communication system 10.

In addition, although communication system 10 has been illustrated with reference to particular elements and operations that facilitate the communication process, these elements and operations may be replaced by any suitable architecture or process that achieves the intended functionality of communication system 10. For example, an external component or module may be positioned in front of each of network elements A-F in order to provide one or more operations as described herein. In addition, network elements A-F may be capable of executing numerous other operations other than those described with reference to FIGS. 1-4. The present invention anticipates considerable flexibility in the placement, positioning, configuration, and operations of network elements A-F.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for communicating packets in a network environment, comprising:

a network element operable to receive a packet and to identify a sequence number included in the packet, wherein the sequence number is associated with a state of one or more adjacent network elements, and wherein the network element is operable to exchange incremental state information with the one or more adjacent network elements if the sequence number included in the packet has not already been received, whereby full neighbor state updates are transmitted when a new neighbor relationship has formed between network elements, and whereby neighboring network elements that already have full state information ignore the full neighbor state updates while those neighboring network elements that are missing state information process the updates, and whereby a state when a full update of information is transmitted is described with a state sequence and subsequent transmissions of a protocol's neighbor state information includes only the state sequence, and whereby if the network element receives two subsequent neighbor state packets from the same neighbor with different state sequences, the network element can request a neighbor state update from a sender by sending a currently known sequence number to a transmitting object.

2. The apparatus of claim 1, wherein the network element includes a transmitter state operable to build and to communicate the packet to a selected one or more of the adjacent network elements.

3. The apparatus of claim 1, wherein the packet is a Hello packet that includes the sequence number in its corresponding header.

4. The apparatus of claim 1, wherein the packet includes a fragment value operable to indicate whether the packet is a fragment to be included with other fragments in order to comprise an entire packet that includes awareness information.

5. The apparatus of claim 1, wherein the network element includes a fragment timer operable to provide a time interval in which fragments are to be received at a selected location in a network.

6. The apparatus of claim 1, wherein the network element is operable to query a selected one of the adjacent network elements in order to receive missing awareness information, and wherein an absence of the missing awareness information is reflected by the sequence number.

7. The apparatus of claim 1, wherein the packet includes a checksum operable to provide an error detection function for the packet at receiving and transmission locations associated with a selected one or more of the network elements.

8. A method for communicating packets in a network environment, comprising:
receiving a packet at a network element;
identifying a sequence number included in the packet, wherein the sequence number is associated with a state of one or more adjacent network elements; and
exchanging incremental state information with the one or more adjacent network elements if the sequence number included in the packet has not already been received, whereby full neighbor state updates are transmitted when a new neighbor relationship has formed between network elements, and whereby neighboring network elements that already have full state information ignore the full neighbor state updates while those neighboring network elements that are missing state information process the updates, and whereby a state when a full update of information is transmitted is described with a state sequence and subsequent transmissions of a protocol's neighbor state information includes only the state sequence. and whereby if the network clement receives two subsequent neighbor state packets from the same neighbor with different state seuuences, the network element can request a neighbor state update from a sender by sending a currently known sequence number to a transmitting object.

9. The method of claim 8, further comprising:
building and communicating the packet to a selected one or more of the adjacent network elements.

10. The method of claim 8, wherein the packet is a Hello packet that includes the sequence number in its corresponding header.

11. The method of claim 8, wherein the packet includes a fragment value operable to indicate whether the packet is a fragment to be included with other fragments in order to comprise an entire packet that includes awareness information.

12. The method of claim 8, further comprising:
providing a time interval in which fragments are to be received at a selected location in a network, wherein the fragments comprise a Hello packet that includes the awareness information.

13. The method of claim 8, further comprising:
querying a selected one of the adjacent network elements in order to receive missing awareness information, wherein an absence of the missing awareness information is reflected by the sequence number.

14. The method of claim 8, further comprising:
providing an error detection function for the packet at receiving and transmission locations associated with a selected one or more of the network elements.

15. A system for communicating packets in a network environment, comprising:
means for receiving a packet at a network element;
means for identifying a sequence number included in the packet, wherein the sequence number is associated with a state of one or more adjacent network elements; and
means for exchanging incremental state information with the one or more adjacent network elements if the sequence number included in the packet has not already been received, whereby full neighbor state updates are transmitted when a new neighbor relationship has formed between network elements, and whereby neighboring network elements that already have full state information ignore the full neighbor state updates while those neighboring network elements that are missing state information process the updates, and whereby a state when a full update of information is transmitted is described with a state sequence and subseiuent transmissions of a protocol's neighbor state information includes only the state sequence, and whereby if the network element receives two subsequent neighbor state packets from the same neighbor with different state sequences, the network element can request a neighbor state update from a sender by sending a currently known sequence number to a transmitting object.

16. The system of claim 15, further comprising:
means for building and communicating the packet to a selected one or more of the adjacent network elements.

17. The system of claim 15, wherein the packet is a Hello packet that includes the sequence number in its corresponding header.

18. The system of claim 15, wherein the packet includes a fragment value operable to indicate whether the packet is a fragment to be included with other fragments in order to comprise an entire packet that includes awareness information.

19. The system of claim 15, further comprising:
means for providing a time interval in which fragments are to be received at a selected location in a network, wherein the fragments comprise a Hello packet that includes the awareness information.

20. The system of claim 15, further comprising:
means for querying a selected one of the adjacent network elements in order to receive missing awareness information, wherein an absence of the missing awareness information is reflected by the sequence number.

21. The system of claim 15, further comprising:
means for providing an error detection function for the packet at receiving and transmission locations associated with a selected one or more of the network elements.

22. Software for communicating packets in a network environment, the software being embodied in a computer readable medium and comprising code such that when executed is operable to:
- receive a packet at a network element;
- identify a sequence number included in the packet, wherein the sequence number is associated with a state of one or more adjacent network elements; and
- exchange incremental state information with the one or more adjacent network elements if the sequence number included in the packet has not already been received, whereby full neighbor state updates are transmitted when a new neighbor relationship has formed between network elements, and whereby neighboring network elements that already have full state information ignore the full neighbor state updates while those neighboring network elements that are missing state information process the updates, and whereby a state when a full update of information is transmitted is described with a state sequence and subsequent transmissions of a protocol's neighbor state information includes only the state sequence, and whereby if the network element receives two subsequent neighbor state packets from the same neighbor with different state sequences, the network element can request a neighbor state update from a sender by sending a currently known sequence number to a transmitting object.

23. The computer readable medium of claim 22, wherein the code is further operable to:
- build and communicate the packet to a selected one or more of the adjacent network elements.

24. The computer readable medium of claim 22, wherein the packet is a Hello packet that includes the sequence number in its corresponding header.

25. The computer readable medium of claim 22, wherein the code is further operable to:
- provide a time interval in which fragments are to be received at a selected location in a network, wherein the fragments comprise a Hello packet that includes the awareness information.

26. The computer readable medium of claim 22, wherein the code is further operable to:
- query a selected one of the adjacent network elements in order to receive missing awareness information, wherein an absence of the missing awareness information is reflected by the sequence number.

27. The computer readable medium of claim 22, wherein the code is further operable to:
- provide an error detection function for the packet at receiving and transmission locations associated with a selected one or more of the network elements.

28. The apparatus of claim 1, wherein the network element is a router and the sequence number is selected from a circular number space.

* * * * *